Figure 1:
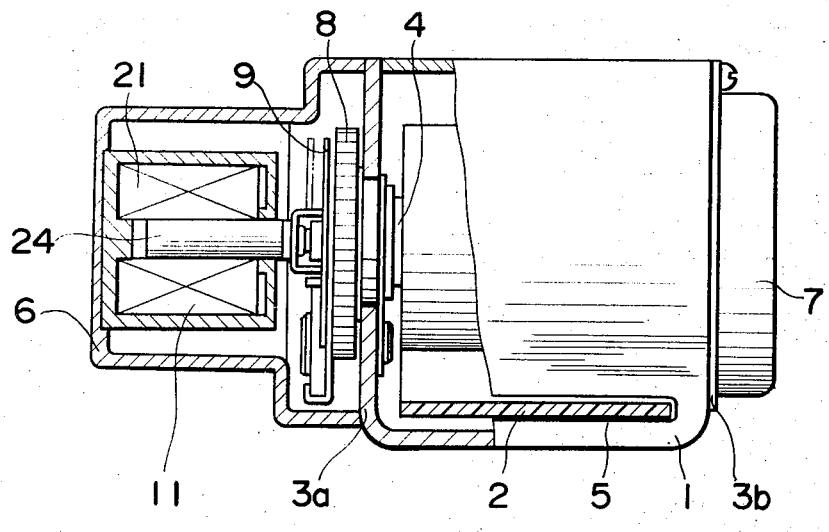

United States Patent [19]

Hayashi et al.

[11] 3,836,171
[45] Sept. 17, 1974

[54] SAFETY BELT LOCKING DEVICE

[75] Inventors: Yoshihiro Hayashi, Toyota; Masahiro Iwatsuki, Anjyo, both of Japan

[73] Assignee: Kabushiki Kaisha Tokai Rika Denki Seisakusko, Aichi-ken, Japan

[22] Filed: July 7, 1972

[21] Appl. No.: 269,737

[30] Foreign Application Priority Data
July 7, 1971  Japan............................... 46-50088
July 7, 1971  Japan............................... 46-50089

[52] U.S. Cl....... 280/150 SB, 180/82 R, 242/107 SB
[51] Int. Cl............................................ B60r 21/10
[58] Field of Search...................... 180/82 R, 82 C; 280/150 SB; 242/107 SB; 297/388

[56] References Cited
UNITED STATES PATENTS

| 2,708,555 | 5/1955 | Heinemann et al. | 280/150 SB X |
| 2,708,966 | 5/1955 | Davis | 280/150 SB X |
| 2,726,826 | 12/1955 | Hoven | 280/150 SB |
| 3,240,510 | 3/1966 | Spouge | 280/150 SB |
| 3,289,970 | 12/1966 | Board et al. | 297/388 X |
| 3,381,268 | 4/1968 | Boblitz | 280/150 SB X |
| 3,659,801 | 5/1972 | Romanzi | 242/107 SB |

*Primary Examiner*—David Schonberg
*Assistant Examiner*—Terrance L. Siemens
*Attorney, Agent, or Firm*—Craig & Antonelli

[57] ABSTRACT

A safety belt locking device for use in a vehicle for automatically locking a belt in the event of an accident of the vehicle in order to prevent the passenger fastened by the belt from further injuries, which includes synchromesh means for synchronizing a pawl plate with a lock gear rigidly mounted on a shaft upon which the belt is wound, thereby permitting engagement between the pawl plate and the lock gear for locking the belt.

6 Claims, 17 Drawing Figures

SAFETY BELT LOCKING DEVICE

The present invention relates to a safety belt locking device for use in a vehicle and, more particularly, to a device for automatically locking, when the vehicle incurrs an accident, a safety seat belt in the vehicle so as to fasten the passenger occupying the seat for protecting him from being injured.

Conventionally, one end of a safety belt for securing the passenger on the seat of the vehicle is connected with a lock device for preventing the belt from being further pulled out from the case, thereby fastening the passenger on the seat in an emergency situation of the vehicle. Such a device is generally controlled by means for detecting the running condition of the vehicle, such as a pneumatic cylinder or an acceleration switch, said means generally being of two types; one of which includes a brake shoe and the other of which comprises a lock gear, rigidly mounted on a shaft to which one end of the belt is attached, and a pawl plate shiftable from a free position to an engaged position for engaging with the teeth of the lock gear. According to the prior art, the former type has a fatal defect in that the operation thereof is delayed for a certain time which is beyond the control of the detecting means, and the latter has disadvantages in durability and reliability because the pawl plate operable by the detecting means tends to fail to engage with the gear teeth rotating at a relatively higher speed which is accompanied by the pulling movement of the belt out from the case as the passenger is moved forward in the accident of the vehicle. Also, the lock device of the conventional form is designed to be operated in response to the ON condition of the detecting means and, hence, it does not correctly operate if the power source or connecting circuit of the detecting means is destroyed by the accident of the vehicle.

Accordingly, an essential object of the present invention is to provide a safety belt locking device for use in a vehicle, which comprises a lock gear, pawl plate, detecting means and synchromesh means for establishing smooth engagement between the lock gear and the pawl plate, with substantial elimination of the above-mentioned disadvantages inherent in the conventional devices of similar character.

Another important object of the present invention is to provide a lock device of the type above referred to wherein the lock gear is momentarily stopped at any time upon correct engagement with the pawl plate under guidance of the synchromesh means operated by the detecting means for placing the lock gear in position to mesh with the pawl plate.

A further object of the present invention is to provide a lock device of the type above referred to wherein the synchromesh means is momentarily and correctly engaged with the lock gear, which begins to rotate by pulling the belt, to prevent rotation of the lock gear and to permit the pawl plate to easily engage with the lock gear for maintaining the lock gear in a locked condition.

A still further object of the present invention is to provide a lock device of the type above referred to wherein the synchromesh means together with the pawl plate is operated by a relatively small amount of power, resulting in a lock device which can be formed in small size.

Another further object of the present invention is to provide a lock device of the type above referred to wherein the synchromesh means can be operated when the detecting means is in the OFF condition so that the lock device can be operated even when the power source for the detecting means is destroyed by the accident of the vehicle.

A still further object of the present invention is to provide a lock device of the type above referred to which can be conveniently made in various sizes, which is simple, compact and light weight in design, which is durable in construction, which requires a reasonable manufacturing cost, and which is capable of performing its intended function in an entirely satisfactory and trouble free manner.

Figure 2:
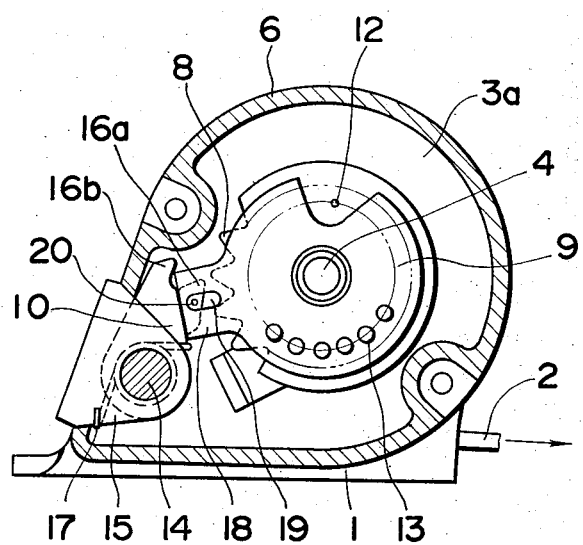
Figure 3:
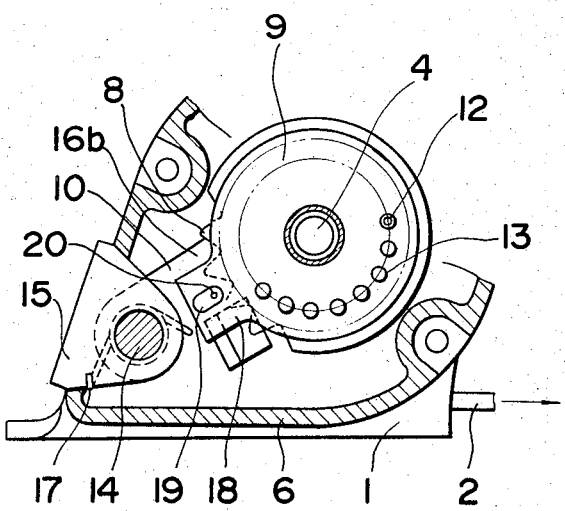
Figure 4:
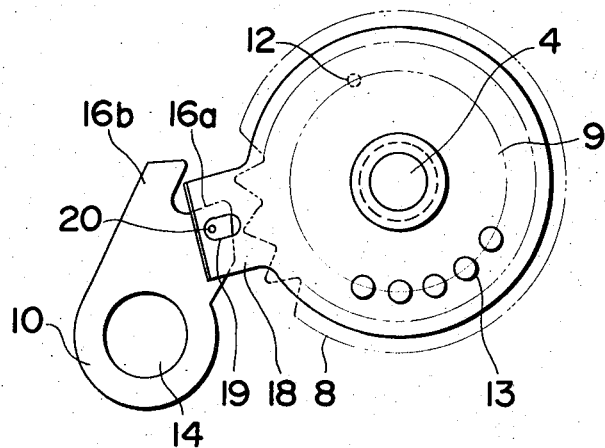
Figure 5:
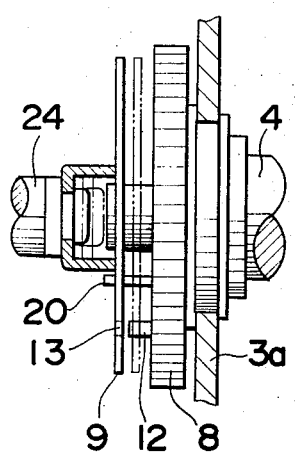
Figure 6:
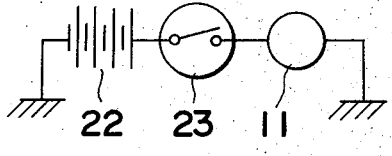
Figure 7:
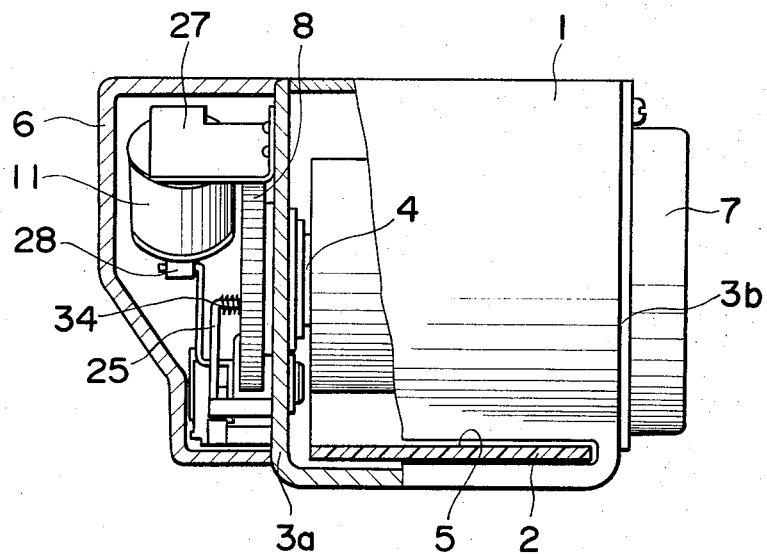
Figure 8:
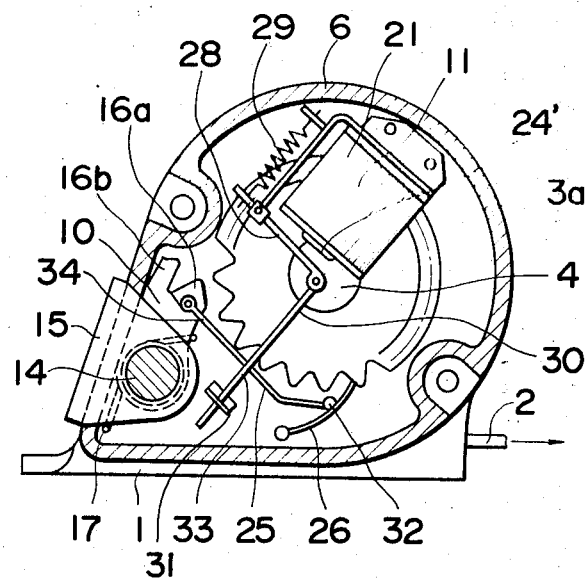
Figure 9:
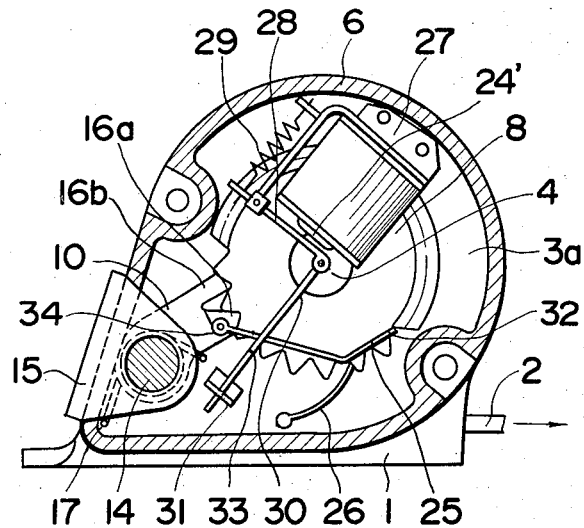
Figure 10:
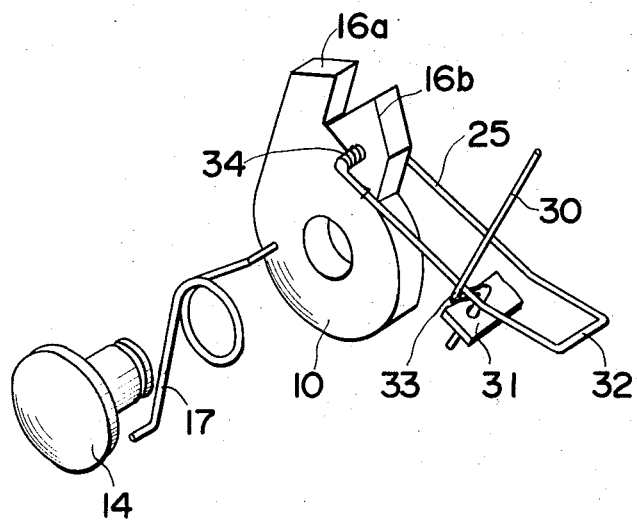
Figure 11:
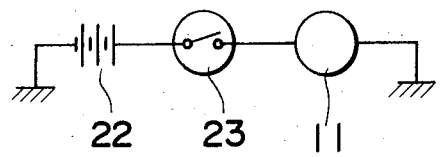
Figure 12:
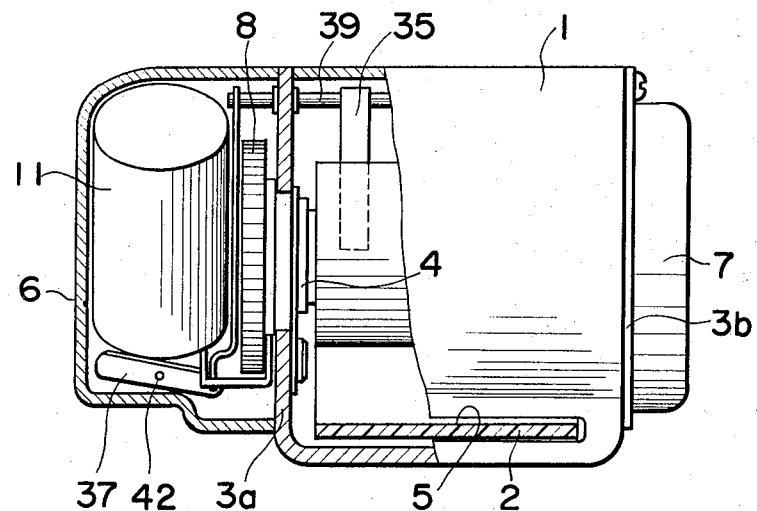
Figure 13:
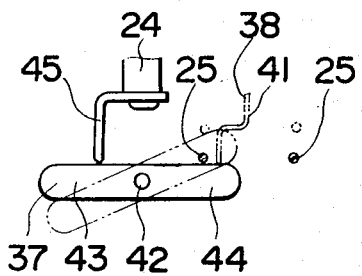
Figure 14:
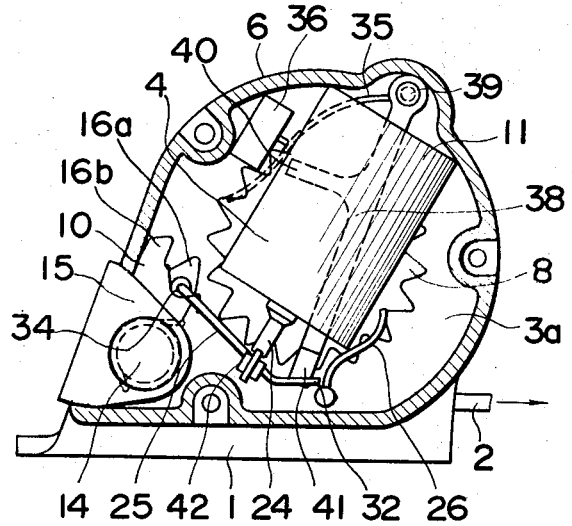
Figure 15:
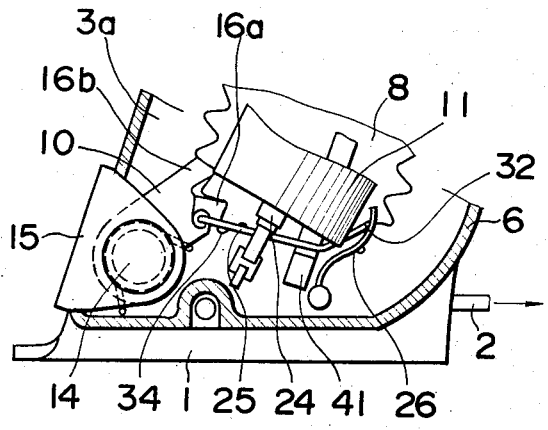
Figure 16:
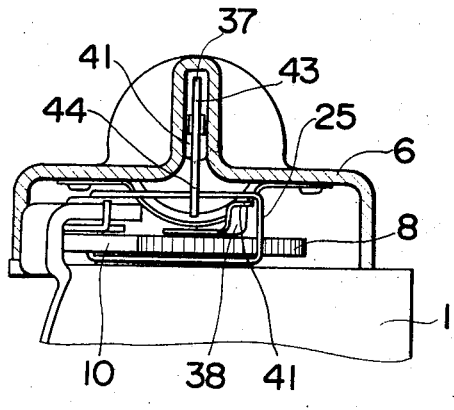
Figure 17:
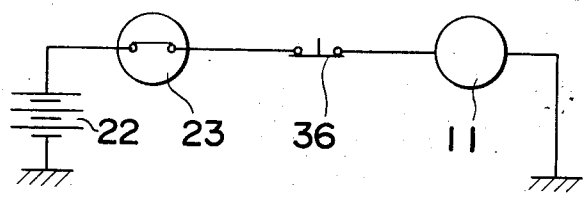

These and other objects and features of the present invention will become apparent from the following description taken in conjunction with preferred embodiments thereof with reference to the accompanying drawings, in which:

FIG. 1 is a partially sectional front view of a lock device according to a first preferred embodiment of the present invention, FIG. 2 is a cross sectional side view of the lock device shown in FIG. 1, FIG. 3 is a similar view to FIG. 2, but partially broken away for showing a manner in which the pawl plate is engaged with the gear teeth, FIG. 4 is a schematic side view, on an enlarged scale, of a ratchet wheel shown in FIG. 2, FIG. 5 is a schematic side view of FIG. 4, FIG. 6 is a circuit diagram of the electromagnetic relay shown in FIG. 1, FIG. 7 is a partially sectional front view of a lock device according to a second preferred embodiment of the present invention, FIG. 8 is a cross sectional side view of a lock device shown in FIG. 7, FIG. 9 is a similar view to FIG. 8, showing a manner in which the pawl plate is engaged with the gear teeth, FIG. 10 is an exploded view, on an enlarged scale, of a ratchet lever shown in FIG. 8, FIG. 11 is a circuit diagram of the electromagnetic relay shown in FIG. 7, FIG. 12 is a partially sectional front view of the lock device according to a third preferred embodiment of the present invention, FIG. 13 is a schematic view partially showing the interlocking lever shown in FIG. 12, FIG. 14 is a cross sectional side view of the lock device shown in FIG. 12, FIG. 15 is a similar view to FIG. 14, but partially broken away for showing a manner in which the pawl plate is engaged with the gear teeth, FIG. 16 is a sectional top plan view of FIG. 12, and FIG. 17 is a circuit diagram of the electromagnetic relay shown in FIG. 12.

Before the description of the present invention proceeds, it is to be noted that, for the sake of brevity, like parts are designated by like reference numerals throughout the several views of the accompanying drawings. It is also to be noted that the concept of the present invention as well as its lock device herein disclosed as preferred embodiments can also be applied in fields of industry other than the automobile.

Referring first to FIG. 1, a case 1 is shown in the form of a container, partially broken away, for accommodating a belt 2, and suitably secured to a framework of a vehicle (not shown) in any known manner. This case 1 has a pair of side plates 3a and 3b, each of which is provided with a bearing (not shown) for receiving a shaft 4 at its center, and a outlet 5 from or into which the belt which is 2 is drawn. The belt of small width and long length is fixed to the shaft 4 at its one end within the case 1 and extends through the outlet 5 to the outside of the case 1. The external end of the belt 2 is suitably connected with a certain portion of a seat (not shown) in the vehicle for securing a passenger between the back of the seat and the belt 2 in any known manner. Both sides of the shaft 4, rotatably journalled between the bearings on the pair of side plates 3a and 3b, are respectively projected beyond the side plates 3a and 3 b and covered by corresponding caps 6 and 7, each of which is suitably secured on the side plates 3a and 3b. In the cap 7 fixed on the right side plate 3b is accommodated a coiled spring (not shown) of which the ends are respectively fixed to the shaft 4 and the cap 7 in any known manner, whereby the belt 2 is normally wound around the shaft 4 by means of the rotating force of the coiled spring. On the other hand, in the gear cap 6 fixed on the left side plate 3a a lock gear 8, ratchet wheel 9, pawl plate 10 and electromagnetic relay 11 are accommodated. The lock gear 8 is fixed on the shaft 4 and the ratchet wheel 9 is slidably mounted on with the shaft 4 so as to permit movement along the shaft while the electromagnetic relay 11 is fixed on the gear cap 6 so as to face to the ratchet wheel 9. The lock gear 8 is provided with a clutch pin 12 near its periphery, and the ratchet wheel 9 is formed with a plurality of knock holes 13 equidistantly spaced with respect to each other and from the periphery of said lock gear 8, the number of said holes 13 being the same as that of teeth of the lock gear 8. Each of these holes 13 is adapted to receive the clutch pin 12, engageable thereinto when the ratchet wheel 9 approaches the lock gear 8 along the shaft 4. The ratchet wheel 9 is normally positioned apart from the lock gear 8 so as to disengage the knock holes 13 from the clutch pin 12 by means of a suitable known member such a spring (not shown) provided between the ratchet wheel 9 and the lock gear 8. The pawl plate 10 is rotatably secured on a shaft 14 mounted on a support piece 15 of the left side plate 3a and provided at its free end with a pair of pawls 16a and 16b which can mesh with the teeth of the lock gear 8 for preventing the same from rotating. A spring 17 is provided between the pawl plate 10 and the support piece 15, thereby to disengage pawl plate 10 from the teeth of the lock gear 8 so long as the electromagnetic relay 11 is not operated. The ratchet wheel 9 is provided on its periphery with a projecting arm portion 18 having a long hole 19, and the pawl plate 10 is provided on its periphery near the pawl 16a with a coupling pin 20 which is loosely inserted into the long hole 19, whereby the pawl plate 10 can be rotated to either engage with or disengage from the teeth of the lock gear 8 in accordance with the rotation of the ratchet wheel 9. The electromagnetic relay 11 includes a solenoid 21 connected in series with a power source 22 through an acceleration switch 23 as shown in FIG. 6, and a movable iron rod 24 which is shifted to push the ratchet wheel 9 in the direction parallel to the axis of the shaft 4 in accordance with either energized condition or disenergized condition of the solenoid 21. When the solenoid 21 is energized, the iron rod 24 is forcedly projected toward the ratchet wheel 9 to push the latter 9 to the lock gear 8 along the shaft 4 while the iron rod 24 is positioned within the solenoid 21 apart from the ratchet wheel 9 when the solenoid 21 is disenergized. The acceleration switch 23 is brought to the ON condition from the OFF condition in response to sudden vehicle speed changes for energizing the solenoid 21.

The lock device constructed as described hereinbefore operates as mentioned hereinafter. When the acceleration switch 23 is in the OFF condition in which case acceleration of the vehicle is normal or zero and the solenoid 21 is disenergized so as not to push the iron rod 24 to the ratchet wheel 9, the ratchet wheel 9 is disengaged from the lock gear 8 as shown in FIG. 2, so as to separate the knock holes 13 of the ratchet wheel 9 from the clutch pin 12 of the lock gear 8 and, then, the pawl plate 10 is disengaged from the lock gear 8 not to mesh the pair of pawls 16a and 16b with the teeth of the lock gear 8 by action of the spring 17. In this condition, the belt 2 is pulled in by the coiled spring of the cap 7 operating on the shaft 4, but the belt 2 is free to go in or out of the outlet 5 of the case 1 and thus loosely fastening the passenger on the vehicle seat. On the contrary, if the vehicle is occasionally brought to a sudden halt by a certain accident and the acceleration switch 23 is switched on in response thereto, the solenoid 21 connected in series with the acceleration switch 23 is energized to push the iron rod 24 to the ratchet wheel 9 so that the ratchet wheel 8 approaches the lock gear 8 to engage one of the knock holes 13 with the clutch pin 12. However, in view of the fact that, when the vehicle is brought to the sudden halt, the body of a passenger in the vehicle usually move forwards. Hence, the belt 2 fastening the passenger on the seat has a tendency to be pulled out from the case 1 in response to the forward movement of the body and the shaft 4 with the lock gear 8 rotates as the belt 2 is pulled out. Upon rotation of the shaft 4 in the manner as hereinabove described, the clutch pin 12 engages in one of the knock holes 13 when it comes into the correct position. All of the times, the clutch pin 12 is easily engages with one of the knock holes 13 adjacent to the clutch pin 12, since the ratchet wheel 9 has a plurality of the knock holes 13 corresponding to the number of the teeth of the lock gear 8. As the ratchet wheel 9 commences to rotate together with the lock gear 8 upon the engagement of the clutch pin 12 in the knock hole 13, the pawl plate 10 rotates in accordance with the rotation of the ratchet wheel 9 by the engagement between the coupling pin 20 and the long hole 19, resulting in that a pair of pawls 16a and 16b of the pawl plate 10 mesh with the teeth of the lock gear 8. Since the ratchet wheel 9 having circularly a plurality of the knock holes 13 corresponding to the gear teeth 8 moves in the axial direction to engage with the lock gear 8 by means of the electromagnetic relay 11 and places the lock gear 8 engageable with the pawl plate 10 without any trouble, the lock operation between the lock gear 8 and the pawl plate 10 is secured at every time in high reliability through the ratchet wheel 9 for synchronizing. Also, such an engagement between the pawls 16a and 16b of the pawl plate 10 and the teeth of the lock gear 8 is completed immediately after the acceleration switch 23 is actuated, and causes the lock gear 8 to stop rotating in the meshed condition so that the belt 2 cannot be pulled out any more and prevents the body of a passenger from the forward movement. Accordingly, the passenger is held safe in the seat of the vehicle substantially at the same time the engagement takes plate by means of the belt 2 fixed by the lock device of the present invention.

From the foregoing description, it has now become clear that the lock device of the present invention comprises a lock gear 8 rigidly mounted on a shaft 4 to which one end of a belt 2 is attached, a lock member such as a pawl plate 10 shiftable from a free position to an engaged position for engaging with the teeth of said lock gear 8, a movable synchromesh member such as a ratchet wheel 9 operable to move for shifting said lock member between the two positions, and control means such as a electromagnetic relay 11 for operating said movable member in response to the running condition of the vehicle, whereby, when the vehicle is brought to the sudden halt and the control means is operated, the lock gear 8 is fixed in one position at any moment by meshing with the lock member operable by the control means through the movable synchromesh member. The lock member is held disengaged and without any possibility of rotation in engagement with the lock gear 8 during a normal vehicle running condition, but is momentarily connected with the lock gear 8 by the mesh therebetween if the vehicle is suddenly braked. Said meshing can be brought about by a plurality of gear teeth in the lock gear 8, a corresponding number of knock holes 13 in the ratchet wheel 9 for engaging with a clutch pin 12 of the lock gear 8 and a pair of pawls 16a and 16b in the pawl plate 10 for engaging with said gear teeth. Therefore, such a mesh, to be effected by the gear teeth, knock holes 13 and pawls 16a and 16b, smoothly takes place at a proper angle of the rotation of the lock gear 8 at all times without any damages either to the lock gear 8 or to the pawl plate 10, and a safety belt 2 with a lock device of improved reliability in emergencies of the vehicle is, accordingly obtained. In addition, the ratchet wheel 9 can be shifted to engage with the lock gear 8 through the clutch pin 12 by means of a pushing force of small value generated in the electromagnetic relay 11, and the lock gear 8 can be rigidly fixed in the position to mesh with the pawl plate 10 through the ratchet wheel 9.

The other preferred embodiment of the lock device of the present invention will be hereinafter described with reference to FIG. 7 to FIG. 11. It is to be noted that an essential feature of this embodiment resides in the provision of a ratchet lever 25 in place of the ratchet wheel 9 described in the first embodiment and of a spring plate 26 for guiding the shift of said ratchet lever 25 so as to ensure an exact engagement between the lock gear 8 and the pawl plate 10 through the ratchet lever of simplified construction. It is further to be noted that most components in this embodiment have substantially the same construction as those in the first embodiment except for the ratchet wheel 9, clutch pin 12, knock holes 13 and coupling pin 20 and accordingly, for the sake of brevity, description in connection with the same construction of the components will be omitted hereinafter.

Referring now to FIG. 7 to FIG. 11, the lock gear 8 is fixed on the shaft 4 projected beyond the left side plate of the case 1. The pawl 10, having a pair of pawls 16a and 16b engageable with the gear teeth, is rotatably mounted on the shaft 14 provided on the support plate 15 of the left side plate 3a with the spring 17 urging the pawl plate 10 so as to disengage from the gear teeth. The electromagnetic relay 11 including the solenoid 21 and the fixed iron rod 24' is mounted on the outside of the left side plate 3a on a mounting piece 27, and the top end of the iron rod 24' faces a movable iron plate 28 of which one end is pivotally connected to the frame of the solenoid 21 with a spring 29 urging the movable iron plate 28 so as to part from the iron rod 24'. When the solenoid 21 is energized in response to the switch-on of the acceleration switch 23, the iron rod 24' attracts the iron plate 28 against the spring 29. The free end of the iron plate 28 is pivotally connected with an actuating lever 30 having a free end slidably supported by an end piece 31 fixed on the cap 6. The pawl plate 10 has a pair of spaced pawls 16a and 16b, the pitch between said pawls 16a and 16b being the same as that of the gear teeth so as to permit meshing with the gear teeth for preventing the latter from rotating. The pawl plate 10 is rotatably provided on its periphery near the pawl 16a with a ratchet lever 25 having a substantially U-shape with the free end portion after portion formed as a end hook 32, easily engageable with the teeth of the lock gear 8 when the ratchet lever 25 moves upwardly. The intermediate portion of ratchet lever 25 is detachably engaged with the intermediate hook portion 33 of the actuating lever 30 so as to permit upward movement of the ratchet lever 25 together with the actuating lever 30. The pawl plate 10 is normally positioned to disengage the gear teeth by means of the spring 17 provided between the pawl plate 10 and the support piece 15, and the ratchet lever 25, made of wire, is normally positioned to engage with the intermediate hook portion of the actuating lever 30 below the lock gear 8, as shown in FIG. 8, by means of a spring 34 provided between the ratchet lever 25 and the pawl plate 10. In this arrangement, if the iron plate 28 is pulled toward the iron rod 24' upon energization of the solenoid 21 against the spring 29, the ratchet lever 25 is upwardly moved through the actuating lever 30 against the spring 34 and, then, the pawl plate 10 is forcibly shifted together with the ratchet lever 25 against the spring 17 to bring the pawls 16a and 16b to mesh with the gear teeth. Before the pawls 16a and 16b mesh into the gear teeth, the end hook 32 of the ratchet lever 25 comes into engagement with the gear teeth 8 so that the pawls 16a and 16b can be smoothly engaged with the gear teeth. Near the free end portion of the ratchet lever 25 is provided a spring plate 26 for guiding the upward movement of the ratchet lever 25 by means of resilient force. This spring plate 26 is engaged with the end hook 32 of the ratchet lever 25 so that as the end hook 32 of said ratchet lever 25 is upwardly shifted, the spring plate 26 is backwardly pushed in sliding contact with said end hook 32 of said ratchet lever 25 so as to accumulate the resilient force. However, so long as the ratchet lever 25 is positioned below the lock gear 8 in which condition the solenoid 21 is disenergized, the spring plate 26 applies no resilient force against said end hook of said ratchet lever 25.

The operation of the second embodiment constructed as described hereinbefore is substantially similar to that of the first embodiment. When the acceleration switch 23 is in the OFF condition in which case the speed of the vehicle is normal or zero and the solenoid 21, connected in series with the acceleration switch 23, is disenergized so as not to attract the iron plate 28 to the iron rod 24', the iron plate 28 is apart from the iron rod 24' by the spring 29 so as to place the actuating lever 30 downward, and the ratchet lever 25 is positioned below the lock gear 8 by the spring 34 permitting the pawl plate 10 to part from lock gear 8 by the spring 17. In this condition, the belt 2 is pulled in by the coiled spring in the cap 7 around the shaft 4, but the belt 2 is free to go in or out of the outlet 5 of the case 1 and thus loosely fastening the passenger on the seat of the vehicle.

On the contrary, when the accelerated switch 23 is brought to the ON condition by an impact generated, for example, in a traffic accident and the solenoid 21 is then energized to attract the iron plate 28 to the iron rod 24', the iron plate 28 is forcibly moved toward the iron rod 24' accompanying corresponding upward movement of the ratchet lever 25 through the actuating lever 30 against the spring 29 and 34. Then, the pawl plate 10 rotates about the shaft 14 so as to engage the end hook 32 of the ratchet lever 25 with the teeth of the lock gear 8 and, to engage the pawls 16a and 16b of the pawl plate 10 with the teeth of the lock gear 8, thereby to cause the lock gear 8 to stop rotating in the meshed condition, and thus preventing the belt 2 from being further pulled out of the case. The upward movement of the ratchet lever 25 quickly takes place by the effect of the resilient force of the spring plate 26 and the engagement between the pawls 16a and 16b of the pawl plate 10 and the teeth of the lock gear 8 completes immediately after the acceleration switch 23 is actuated. In this embodiment, the power source 22 needs merely to implement the upward movement of the actuating lever 30 and the spring plate 26 aids to complete the quick upward movement of the ratchet lever 25, so that the engagement between the gear teeth and the pawls 16a and 16b is momentarily carried out without any trouble unless the power source 22 is destroyed before the acceleration switch 23 is operated. In addition, the engagement between the gear teeth and the pawls 16a and 16b is achieved after the engagement between the gear teeth and the end hook 32 of the ratchet lever 25 is completed. Also, the ratchet lever 25, made of wire, is simple in construction and manufactured with low cost as compared with the ratchet wheel 9 of the first embodiment.

A further preferred embodiment of the lock device of the present invention will be hereinafter described with reference to FIG. 12 to FIG. 17. It is to be noted that an essential feature of this embodiment resides in the provision of a movable arm 35 for detecting the winding condition of the belt 2, and microswitch 36 operable by the above mentioned arm 35 so as to ensure the exact operation of the lock device except for the unused condition of the belt 2. In addition, the electromagnetic relay 11 is designed to operate the ratchet lever 25 in the OFF condition so that the locking operation of the ratchet lever 25 occurs even when the driving circuit of the above mentioned switches 36 and 11 is destroyed by the accident of the vehicle. Further, it is to be noted that most components in this embodiment have substantially the same construction as those in the second embodiment except for the provision of the movable arm 35, microswitch 36, interlocking lever 37 and actuating arm 38 provided in place of the actuating level 30 described in the second embodiment, and accordingly, for the sake of brevity, description in connection with the construction of the same components will be omitted hereinafter.

Referring now to FIG. 12 to FIG. 17, the detecting arm 35 made of an arc shaped plate is rigidly mounted at its one end on a shaft 39 rotatably journaled between both the side plates 3a and 3b forming the case so as to normally contact with the external surface of the belt 2 wound on the shaft 4 of the lock gear 10. This detecting arm 35 is always urged by its gravity toward the shaft 4 to follow the external surface of the belt 2, so that the diameter of the belt wound on the shaft 4 can be detected by said arm 35 with the reduction of the belt converted into the rotating angles of the shaft 39. On the left end of the shaft 39 projecting beyond the left side plate 3a is rigidly provided the actuating arm 38 having a pair of free end portions 40 and 41 for detachably engaging with the microswitch 36 provided in the cap 6 and the end portion of the interlocking lever 37 rotatably pivoted on the cap 6 with a shaft 42, respectively. When the detecting arm 35 is positioned to detect full winding, that is, the largest diameter of the belt 2 inserted in the case 1, in which condition the passenger does not use it in the vehicle, one end portion 40 of the actuating arm 38 operates to open the microswitch 36 connected in series with the electromagnetic relay 11 and the other end portion 41 of the actuating arm 38 engages the end portion 44 of the interlocking lever 37 for preventing the latter from rotating, while, when the detecting arm 35 is positioned to detect unfull winding or vacancy of the belt 2 of which the remains are pulled out from the outlet 5 of the case 1 by the passenger for fastening himself with it on the seat of the vehicle, one end portion 40 of the actuating arm 38 is apart from the microswitch 36 to leave it in the ON condition and the other portion 41 of the actuating arm 38 disengages with the interlocking lever 37 to allow to rotate. The interlocking lever 37 rotatably mounted on the shaft 42 is engaged at its one end with an operating piece 45 of the movable iron rod 24 of the electromagnetic relay 11 and at its other end with both end portion 41 of the actuating arm 38 in the OFF condition of the microswitch 36 and the end portion of the ratchet lever 25 connected with the pawl plate 10, as shown in FIG. 13. When the microswitch 36 in in the OFF condition, the end portion 41 of the actuating arm 38 is downwardly engaged with the one end of the interlocking lever 37 while, when the microswitch 36 in in the normal ON position, the end portion 41 of the actuating arm 38 is shifted to part from the end of the interlocking lever 37 which is always engaged with both the operating piece 45 of the movable iron rod 24 and the end portion of the ratchet lever 25 on its upper surface. Therefore, although, when the end portion 41 of the actuating arm 38 is engaged with the interlocking lever 37, the interlocking lever 37 is positioned as indicated by the real line in FIG. 13 not to rotate and the operating piece 45 of the movable iron rod 24 does not downwardly push the interlocking lever 37 in the normal ON condition of the solenoid 11. When the end portion 41 of the actuating arm 38 is shifted to part from the interlocking lever 37, the interlocking lever 37 is caused to rotate together with the end portion of the ratchet lever 25 by pushing the operating piece 45 of the movable iron rod 24 in the OFF condition of the solenoid 11 and, then, the ratchet lever 25 upwardly rotates to engage with the teeth of the lock gear 8 together with the pawl plate 10 under the guidance of the spring plate 26 in the same manner described in the second embodiment. In this embodiment, the electromagnetic relay 11 attracts the movable iron rod 24 into the solenoid in the ON condition when the acceleration switch 23 detects the normal running of the vehicle, but the electromagnetic relay 11 is operated to push the movable iron rod 24 out from the solenoid in the OFF condition without relation to the driving circuit of the acceleration switch 23.

The operation of the third embodiment constructed as described hereinbefore is partially similar to that of the second embodiment. When the detecting arm 35 attaches the belt 2 wound in full on the shaft 4 because of unusage of the belt by the passenger, the actuating arm 38 operates the microswitch 36 in the OFF condition which, in turn, operates the electromagnetic relay 11 in the OFF condition, the engages at its other end with the interlocking lever 37 so as not to rotate the interlocking lever 37 together with the ratchet lever 25 even though the electromagnetic relay 11 tends to push the iron rod 24 to the interlocking lever 37. In this condition, the ratchet lever 24 is placed in the position apart from the lock gear 8 by the spring 34 and the pawl plate 10 is positioned not to mesh with the lock gear 8 by the spring 17, whereby the belt 2 is free to go out of the outlet 5 of the case 1. On the contrary, if the passenger of the vehicle pulls the belt 2 from the case 1 against the coiled spring and the detecting arm 35 rotates with the actuating arm 38 to follow the reduction of the diameter of the winding belt 2, the actuating arm 38 is apart from the microswitch 36 which is switched to the normal ON condition and also apart from the interlocking lever 37 so as to leave the latter 37 to the operating piece 45 of the movable iron rod 24. At this time, the electromagnetic relay 11 is operated in the normal ON condition in accordance with the switching operation of the microswitch 36 for maintaining the same condition not to rotate the interlocking lever 37, whereby the belt is free to go in or out of the case 1 and, thus, capable to loosely fasten the passenger with the belt 2 on the seat of the vehicle. In this condition, if the acceleration switch 23 is brought to the OFF condition from the ON condition by a certain accident of the vehicle and the electromagnetic relay 11 is switched to the OFF condition to extend the movable iron rod to the interlocking lever 37, the interlocking lever 37 is rotated about the shaft 41 so as to push the end portion of the ratchet lever 25 upward together with the pawl plate 10. Accordingly, the ratchet lever 25 is brought to engage with the gear teeth at its end hook 32 and, then, the pawl plate is engaged with the gear teeth to stop rotating in the meshed condition, thus preventing the belt 2 from being further pulled out. The upward movement of the ratchet lever 25 in accordance with the rotation of the interlocking lever 37 quickly takes place by the action of the spring plate 26, and the engagement between the pawl plate 10 and the lock gear 8 is completed immediately after either the acceleration switch is actuated or the driving circuit of the electromagnetic relay 11 is off. Therefore, the lock device can be avoided the unnecessary operation when the belt is unused, and can be correctly operated even when the driving circuit thereof is destroyed by the accident of the vehicle.

Although the present invention has been fully described with reference to the accompanying drawings in connection with the preferred embodiments thereof, various changes and modifications are apparent to those skilled in the art. Therefore, the present invention is not limited thereby and such changes and modifications should be construed as included within the scope of the present invention unless otherwise they depart therefrom.

What is claimed is:

1. A safety belt locking device for use in a vehicle which comprises a lock gear rigidly mounted on a shaft to which one end of a belt is secured for winding the belt thereon against a coiled spring, a pawl plate positioned apart from the lock gear and movable for engagement with the lock gear for preventing the lock gear from rotating, a synchromesh means shiftable from a position apart from the lock gear to a position engaging with the lock gear so as to interlock the pawl plate to engage with the lock gear, and control means including an electromagnetic relay for shifting the synchromesh means and an acceleration switch for detecting running condition of the vehicle.

2. A safety belt locking device as claimed in claim 1, wherein said synchromesh means include a ratchet wheel provided on the shaft which is shiftable in the axial direction of the shaft by the control means, and having a plurality of knock holes concentrically arranged, each of which is engageable with a clutch pin provided on the lock gear so as to interlock the pawl plate to engage with the lock gear.

3. A safety belt locking device as claimed in claim 1, wherein said synchromesh means includes a ratchet lever rotatably provided on the pawl plate which is shiftable from a position apart from the lock gear to a position engaging with the lock gear by the control means, the ratchet lever having a hook portion engageable with the lock gear so as to interlock the pawl plate to engage with the lock gear.

4. A safety belt locking device as claimed in claim 3, wherein said synchromesh means further comprises a spring plate having resilient force for guiding the shift movement of the ratchet lever.

5. A safety belt locking device as claimed in claim 1, further comprising means for detecting condition of the belt wound on the shaft for controlling the operation of the control means when the full winding of the belt is detected.

6. A safety belt locking device as claimed in claim 1, wherein said control means operate to shift the synchromesh means when the control means is in the OFF position.

* * * * *